(12) United States Patent
Lambert et al.

(10) Patent No.: US 7,521,502 B2
(45) Date of Patent: Apr. 21, 2009

(54) LOW FOAMING PVOH AEROSOL SPRAY COATINGS

(75) Inventors: Georgia Lynn Lambert, La Porte, TX (US); Darin Michael Palmer, Lewisville, TX (US); Eduardo Nochebuena-Romero, Pearland, TX (US); Richard Vicari, Pearland, TX (US); Arnold Ybarra, League City, TX (US)

(73) Assignee: Celanese International Corporation, Dallas, TX (US)

( * ) Notice: Subject to any disclaimer, the term of this patent is extended or adjusted under 35 U.S.C. 154(b) by 527 days.

(21) Appl. No.: 11/358,255

(22) Filed: Feb. 21, 2006

(65) Prior Publication Data

US 2007/0208120 A1    Sep. 6, 2007

(51) Int. Cl.
*C08L 29/04* (2006.01)

(52) U.S. Cl. .................. 524/503; 524/287; 524/379

(58) Field of Classification Search .................. 524/503, 524/287, 379
See application file for complete search history.

(56) References Cited

U.S. PATENT DOCUMENTS 4,482,662 A * 11/1984 Rapaport et al. ............ 523/504
5,550,182 A *  8/1996 Ely et al. .................... 524/557

* cited by examiner

*Primary Examiner*—Ling-Siu Choi
*Assistant Examiner*—Hui Chin
(74) *Attorney, Agent, or Firm*—M. Susan Spiering

(57) ABSTRACT

In an aerosol spray composition suitable for coating automobile exteriors, where the aerosol composition is pressurized in a container with propellant and includes water and a polyvinyl alcohol composition, the improvement being that said polyvinyl alcohol composition includes: a) from 50 to 99 wt % of a partially hydrolyzing first polyvinyl alcohol resin having a degree of hydrolysis in the range of from about 80 to about 90 percent; and (b) from 1 to 50 wt % of a second polyvinyl alcohol resin having an elevated degree of hydrolysis.

17 Claims, No Drawings

LOW FOAMING PVOH AEROSOL SPRAY COATINGS

TECHNICAL FIELD

The present invention relates generally to polyvinyl alcohol (PVOH) water-soluble coatings that are applied as an aerosol spray. The inventive coating may be applied to an automobile to act as a shield to protect the finish from crushed insects or other road detritus that may be encountered on a highway trip.

BACKGROUND OF THE INVENTION

Aerosol sprays are well known in the art, and are commonly used in applications such as spray paints, cleaning solutions, disinfectants, deodorants, air fresheners, insect repellants, hair spray, and the like. For example, United States Patent Application Publication No. 2004/0261655 to Newbacher et al. discloses a paint-based aerosol composition for marking surfaces.

Typically, aerosol cans include liquid compositions, referred to here as aerosol compositions, that are sealed under pressure in a metal can, or other container, with a propellant. The container typically has a push-button valve or nozzle which, when activated, allows the propellant to expand and carry the liquid out of the container in the form of an aerosol spray or mist. Spray-can based coating products have advantages over other forms, especially including convenience in that additional tools or equipment is unnecessary when applying a coating.

Liquid compositions for aerosol-applied coatings, particularly compositions for coatings including aqueous PVOH, are subject to foaming, fish-eye and other defects when applied, even when carefully used. Moreover, aqueous PVOH compositions are susceptible to freeze/thaw separation and can cause corrosion of the aerosol can in which they are disposed.

The present invention is directed generally to an improved aerosol spray that may be conveniently applied to the exterior of an automobile, such as a car or a motorcycle, where, among other properties, the spray exhibits superior coating characteristics and has improved freeze/thaw resistance.

SUMMARY OF THE INVENTION

The improved aerosol compositions of the invention provide coatings which can protect the exterior surfaces of automobiles from damage or blemishes caused by insects, bugs, and debris that is encountered during travel. The coatings are water soluble, so that they may be applied before an outing and subsequently washed off. The inventive coatings advantageously include a low foaming PVOH blend of relatively low molecular weight components, an evaporative organic solvent and corrosion inhibitors to provide a unique combination of properties.

In one aspect of the present invention there is provided, an aerosol composition suitable for coating automobile exteriors, where the aerosol composition is pressurized in a container with propellant and includes water and a polyvinyl alcohol composition, the improvement being that the polyvinyl alcohol composition includes: (a) from 50 to 99 wt. % (wt. %) of a partially hydrolyzed first polyvinyl alcohol resin having a degree of hydrolysis in the range of from about 80 to about 90 percent; and (b) from 1 to 50 wt. % of a second polyvinyl alcohol resin having an elevated degree of hydrolysis, i.e. more hydrolyzed than the first resin.

In some cases the polyvinyl alcohol composition includes from about 60 to about 95 percent by weight of the partially hydrolyzed first polyvinyl alcohol resin and from about 5 to about 40 wt. % of the second polyvinyl alcohol resin having an elevated degree of hydrolysis. In still other embodiments the polyvinyl alcohol composition includes from about 70 to about 90 percent by weight of the partially hydrolyzed first polyvinyl alcohol resin and from about 10 to about 30 wt. % of the second polyvinyl alcohol resin having an elevated degree of hydrolysis. In a preferred series of aerosol coatings the polyvinyl alcohol composition includes from about 50 to about 99 percent by weight of the partially hydrolyzed first polyvinyl alcohol resin and from about 1 to about 50 wt. % of the second polyvinyl alcohol resin having an elevated degree of hydrolysis.

Generally, the second polyvinyl alcohol resin is 95-99.5 percent hydrolyzed and has a characteristic viscosity of less than about 15 cps; perhaps most preferably in the range of from 1 cps to 7 cps. In some embodiments, the second polyvinyl alcohol resin may have a degree of hydrolysis of from about 91 to about 95 percent.

So also, the partially hydrolyzed first polyvinyl alcohol resin generally has a characteristic viscosity of less than about 15 cps; perhaps most preferably in the range of from 1 cps to 7 cps. Typically, the partially hydrolyzed first polyvinyl alcohol resin has a degree of hydrolysis of from about 85 to about 90 percent.

The polyvinyl alcohol composition is present in the aerosol spray in amounts of from about 3 to about 40 wt. % based on the total weight of the aerosol composition in a series of typical compositions practicing the present invention, such as wherein the polyvinyl alcohol composition is present in the aerosol spray in amounts of from about 5 to about 25 wt. % based on the total weight of the aerosol composition; or wherein the polyvinyl alcohol composition is present in the aerosol spray in amounts of from about 5 to about 15 wt. % based on the total weight of the aerosol composition.

In another aspect of the invention, there is provided in an aerosol composition which is pressurized in a container with propellant, where the aerosol composition includes water and polyvinyl alcohol resin, the improvement that the aerosol composition includes (a) from about 25 to about 75 wt. % water; (b) from about 10 to 60 wt. % of an organic solvent; (c) from about 5 to 25 wt. % of a partially hydrolyzed first polyvinyl alcohol resin that has a degree of hydrolysis in the range of from about 80 to about 90 percent; and (d) from about 5 to 25 wt. % of a second polyvinyl alcohol resin that has an elevated degree of hydrolysis in the range of from about 95 to about 99.5 percent. Typically, the aerosol composition comprises from 40 to 60 wt. % water and from 20 to 50 wt. % of an organic solvent. A preferred organic solvent is ethanol and most preferably the aerosol composition further comprises a corrosion inhibitor selected from the group consisting of sodium benzoate, ammonia, and combinations thereof.

In still yet another aspect of the invention, an improvement resides in providing a PVOH resin having a degree of hydrolysis in the range of from 95 to 99.5 percent to an aerosol composition, preferably in a blend with another PVOH resin having a degree of hydrolysis in the range of from 80 to 90 percent wherein the 80-90 percent hydrolyzed PVOH resin is present in amounts of at least 1.5 times that of the 95.0-99.5 percent hydrolyzed PVOH resin, on a weight basis. In especially preferred embodiments of the invention, both PVOH resins have a characteristic viscosity in the range of from 1 cps to 7 cps.

DETAILED DESCRIPTION OF THE INVENTION

Still further features and advantages of the invention are apparent from the following description.

The invention is described in detail below for purposes of exemplification and illustration only. Modifications to particular embodiments within the spirit and scope of the present invention, set forth in the appended Claims, will be readily apparent to those of skill in the art.

Unless more specifically defined, terminology as used herein is given its ordinary meaning. Percent, for example, refers to wt. %, unless context indicates otherwise, e.g., the degree of hydrolysis of a polyvinyl alcohol resin is reported in mole percent.

The present invention provides a stable aerosol composition that, when applied, provides a polymeric coating on the surface of the automobile. The coating helps protect the vehicle from crushed bugs or other debris which may damage the finish, or may be difficult to wash off. In preferred embodiments of the present invention, the aerosol composition comprises water, an organic solvent evaporative, a blend of polyvinyl alcohol resins, and optional adjuvants such as corrosion inhibitors, biocides, defoaming agents, and the like.

An essential component of the aerosol sprays used in the present invention is a polyvinyl alcohol composition. As used herein, "polyvinyl alcohol," "PVOH" and like terminology means polyvinyl alcohol resins which are typically prepared from polyvinyl acetate resins by saponification thereof which is well known in the art. PVOH resins are derived from homopolymers of vinyl acetate as well as copolymers of vinyl acetate with other ethylenically unsaturated monomers.

The polyvinyl alcohol (PVOH) resins may be based on vinyl acetate homopolymer or copolymers of vinyl acetate with any suitable comonomer and/or blends thereof. PVOH resins employed in the present invention are predominately (more than 75 mole %) based on vinyl acetate monomer which is polymerized and subsequently hydrolyzed to polyvinyl alcohol. Generally, the resins are 99 mole percent or more vinyl acetate derived. If used, comonomers may be present from about 0.1 to 25 mole % with vinyl acetate and include acrylic comonomers such as AMPS or salts thereof. Other suitable comonomers include glycol comonomers, versatate comonomers, maleic or lactic acid comonomers, itaconic acid comonomers and so forth. Vinyl versatate including alkyl groups (veova) comonomers may likewise be useful. See Finch et al., Ed. *Polyvinyl Alcohol Developments* (Wiley 1992), pp. 84 and following. The comonomers may be grafted or co-polymerized with vinyl acetate as part of the backbone. Likewise, homopolymers may be blended with copolymers, if so desired.

In general, polyvinyl acetate in an alcohol solution can be converted to polyvinyl alcohol, i.e. —OCOCH$_3$ groups are replaced by —OH groups through "hydrolysis", also referred to as "alcoholysis." The degree of hydrolysis refers to the mole % of the resin's vinyl acetate monomer content that has been hydrolyzed. Methods of producing polyvinyl acetate-polyvinyl alcohol polymers and copolymers are known to those skilled in the art. U.S. Pat. Nos. 1,971,951; and 2,109,883, as well as various literature references describe these types of polymers and their preparation. Among the literature references are "Vinyl Polymerization", Vol. 1, Part 1, by Ham, published by Marcel Dekker, Inc., (1967) and "Preparative Methods of Polymer Chemistry", by Sorenson and Campbell, published by Interscience Publishers, Inc., New York (1961).

Exemplary PVOH resins which are commercially available from Celanese Corporation (Dallas, Tex.) are illustrated in Table 1, below.

TABLE 1

Polyvinyl Alcohol Resins

| Grade | % Hydrolysis, | Viscosity, cps[1] |
|---|---|---|
| Super Hydrolyzed | | |
| Celvol 125 | 99.3+ | 28-32 |
| Celvol 165 | 99.3+ | 62-72 |
| Fully Hydrolyzed | | |
| Celvol 103 | 98.0-98.8 | 3.4-4.5 |
| Celvol 305 | 98.0-98.8 | 4.5-5.5 |
| Celvol 107 | 98.0-98.8 | 5.5-6.6 |
| Celvol 310 | 98.0-98.8 | 9.0-11 |
| Celvol 325 | 98.0-98.8 | 28.0-32.0 |
| Celvol 503 | 98.0-98.8 | 62-72 |
| Intermediate Hydrolyzed | | |
| Celvol 418 | 91.0-93.0 | 14.5-19.5 |
| Celvol 425 | 95.5-96.5 | 27-31 |
| Partially Hydrolyzed | | |
| Celvol 502 | 87.0-89.0 | 3.0-3.7 |
| Celvol 203 | 87.0-89.0 | 3.5-4.5 |
| Celvol 205 | 87.0-89.0 | 5.2-6.2 |
| Celvol 513 | 86.0-89.0 | 13-15 |
| Celvol 523 | 87.0-89.0 | 23-27 |
| Celvol 540 | 87.0-89.0 | 45-55 |

[1] 4% aqueous solution, 20° C.

The polyvinyl alcohol composition used in the inventive aerosols includes a PVOH resin that is from 95.0 to 99.5 percent hydrolyzed (preferably Celvol 103), and usually also includes PVOH that is from 80 to 93 percent hydrolyzed (preferably Celvol 203 or Celvol 502). In more typical embodiments, the composition is a blend which comprises 50 wt. % or more PVOH resin that is from 86-90 percent hydrolyzed, and 50 wt. percent or less of PVOH resin that is from 97-99.0 percent hydrolyzed. Especially preferred PVOH resins have low molecular weights, such that they have a characteristic viscosity (as measured in a 4% aqueous solution at 20° C.) of less than about 15 cps, and preferably in the range of from 1 cps to 5 cps.

The PVOH composition used in the invention is critical to the performance of the inventive automotive coatings. For example, while partially hydrolyzed PVOH resins are more soluble and provide stability including freeze/thaw stability and enable a composition with high solids contents, they have a tendency to foam when expelled from the pressurized containers which is undesirable for the coatings of the present invention. The inclusion of a blend of fully hydrolyzed PVOH and partially hydrolyzed PVOH is preferred because it provides for a spray that exhibits low foaming. The PVOH resins preferably have a characteristic viscosity of about 5 cps or less and are combined with an evaporative organic solvent such as ethanol or propyl alcohols such as isopropyl alcohol or n-propel alcohol and so forth.

The aerosol sprays of the invention generally include water and an organic solvent evaporative, where the polyvinyl alcohol composition is substantially dissolved in the water/solvent mixture. Preferably, the evaporative should be miscible with water and have a boiling point in the range of from 60° C. to 100° C. A preferred evaporative for use in the invention is ethanol. While the use of water by itself may be suitable in some embodiments, the inclusion of an organic solvent allows the liquid to evaporate more quickly, and general enhances the film forming properties as well as allows for a higher solids content if so desired. Additionally, the organic solvent provides the coating with greater freeze/thaw resistance and is thus a salient feature.

The organic solvent also makes it possible to utilize very high solids if so desired, in the range of 20-30 wt. % or more such as 25-35 wt. %; 30-40 wt %; or even 40-50 wt. %. Anywhere from 20-50% solids may thus be employed.

The aerosol composition preferably also includes a corrosion/rust inhibitor to prevent corrosion of the aerosol container. The cans can have an epoxy liner. However, at times, defects in the liner such as pin holes will allow corrosion to occur. The present composition will inhibit or avoid such corrosion inside the can. Sodium benzoate is suitable to reduce corrosion in the liquid phase of the aerosol. Additionally, small amounts of ammonia or other suitable bases may be added to raise the pH and reduce corrosion in the vapor space of an aerosol can. Other adjuvants may be added to the aerosol composition as is desired, such as biocides, defoaming agents, antioxidants, and UV protectors.

The aerosol composition of the invention has the following preferred composition based on total weight:

(a) about 50 wt. % water;
(b) about 30-40 wt. % of ethanol;
(c) about 5-25 wt. % of fully hydrolyzed PVOH resin, such as Celvol 103;
(d) about 5 to 25 wt. % of a partially hydrolyzed PVOH resin, such as Celvol 203 or Celvol 502;
(e) about 10 to 100 ppm (weight) of sodium benzoate; and
(f) about 5 to 100 ppm (weight) of an ammonium compound or other basic compound such as sodium hydroxide.

The aerosol composition of the invention is typically pressurized with a propellant in a metal container such as a can, which has a depressable valve or nozzle through which the aerosol spray exits. Suitable aerosol dispensing containers are well known in the art as is described in U.S. Pat. Nos. 6,802,461; 6,394,364; and 5,664,706, the entireties of which are incorporated herein by reference.

The aerosol coating is driven out of the pressurized can by expanding the volatile propellant upon activating the valve/nozzle. Typically, the propellant is gaseous at standard temperature and pressure, and is substantially miscible with the liquid solution when pressurized in the spray can. The propellant suitably has a boiling point at atmospheric pressure of less than about 40° C., and preferably less than about 20° C. The choice of propellant is not particularly limited, and suitable propellants which may be used include volatile hydrocarbons such as propane, n-butane, isobutane, pentane, isopentane; dialkyl ethers such as dimethyl ether and methylethyl ether; fluorocarbons such as 1,1-difluoroethane; carbon dioxide and nitrous oxide; or any combinations of the preceding. The propellant may be present in amounts of from 5 to 60 percent of the weight of the aerosol composition. It should be understood that the propellant is not generally considered to be part of the aerosol composition because it separates quickly after exiting the container. Accordingly, for the purposes of this description, the aqueous aerosol compositions are defined in amounts exclusive of the weight of propellant.

The coatings may be provided to the exterior of an automobile by depressing the push button valve or nozzle, and directing the aerosol stream in the direction of the automotive surface. The aerosol composition forms a clear film upon drying, and prevents bugs or debris from adhering to the paint or windows of the vehicle. When desired, the PVOH coating, and any debris encountered, may be removed by washing off the coating with water optionally in combination with mechanical means such as rubbing or peeling.

While the invention has been illustrated in connection with several examples, modifications to these examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. In an aerosol composition suitable for coating automobile exteriors, where the aerosol composition is pressurized in a container with a propellant, the improvement being that said aerosol composition includes water, an organic solvent, and a polyvinyl alcohol composition, the polyvinyl alcohol composition comprising:

(a) from 50 to 99 wt % based on the total amount of polyvinyl alcohol resin present, of a partially hydrolyzed first polyvinyl alcohol resin having a degree of hydrolysis in the range of from about 80 to about 90 percent; and (b) from 1 to 50 wt % based on the total amount of polyvinyl alcohol resin present, of a second polyvinyl alcohol resin selected from the group consisting of a polyvinyl alcohol resin having a degree of hydrolysis in the range from 91 percent to 95 percent, and a polyvinyl alcohol resin having a degree of hydrolysis in the range from 95 to 99.5 percent;

wherein the organic solvent is miscible with water, and wherein the organic solvent has a boiling point in the range from 60° C. to 100° C.

2. The aerosol composition according to claim 1, wherein the polyvinyl alcohol composition includes from about 60 to about 95 percent by weight of said partially hydrolyzed first polyvinyl alcohol resin and from about 5 to about 40 wt % of said second polyvinyl alcohol resin.

3. The aerosol composition according to claim 1, wherein the polyvinyl alcohol composition includes from about 70 to about 90 percent by weight of said partially hydrolyzed first polyvinyl alcohol resin and from about 10 to about 30 wt % of said second polyvinyl alcohol resin

4. The aerosol composition according to claim 1, wherein the second polyvinyl alcohol resin is 95-99.5 percent hydrolyzed and has a characteristic viscosity of less than about 15 cps.

5. The aerosol composition according to claim 1, wherein the second polyvinyl alcohol resin is 95-99.5 percent hydrolyzed and has a characteristic viscosity in the range of from 1 cps to 7 cps.

6. The aerosol composition according to claim 1, wherein the second polyvinyl alcohol resin has a degree of hydrolysis of from about 91 to about 95 percent.

7. The aerosol composition according to claim 1, wherein the partially hydrolyzed first polyvinyl alcohol resin has a characteristic viscosity of less than about 15 cps.

8. The aerosol composition according to claim 1, wherein the partially hydrolyzed first polyvinyl alcohol resin has a characteristic viscosity in the range of from 1 cps to 7 cps.

9. The aerosol composition according to claim 1, wherein the partially hydrolyzed first polyvinyl alcohol resin has a degree of hydrolysis of from about 85 to about 90 percent.

10. The aerosol composition according to claim 1, wherein the polyvinyl alcohol composition is present in the aerosol spray in amounts of from about 3 to about 40 wt % based on the total weight of the aerosol composition.

11. The aerosol composition according to claim 1, wherein the polyvinyl alcohol composition is present in the aerosol spray in amounts of from about 5 to about 25 wt % based on the total weight of the aerosol composition.

12. The aerosol composition according to claim 1, wherein the polyvinyl alcohol composition is present in the aerosol spray in amounts of from about 5 to about 15 wt % based on the total weight of the aerosol composition.

13. In an aerosol composition which is pressurized in a container with propellant, where the aerosol composition includes water and polyvinyl alcohol resin, the improvement being that said aerosol composition comprises:

(a) from about 25 to about 75 wt % water;

(b) from about 10 to 60 wt % of an organic solvent;

(c) from about 5 to 25 wt % of a partially hydrolyzed first polyvinyl alcohol resin that has a degree of hydrolysis in the range of from about 80 to about 90 percent; and (d) from about 5 to 25 wt % of a second polyvinyl alcohol resin that has a degree of hydrolysis in the range of from about 95 to about 99.5 percent.

14. The aerosol composition according to claim 13, wherein the aerosol composition comprises from 40 to 60 wt % water.

15. The aerosol composition according to claim 13, wherein the aerosol composition comprises from 20 to 50 wt % of the organic solvent.

16. The aerosol composition according to claim 13, wherein the organic solvent is ethanol.

17. The aerosol composition according to claim 13, wherein the aerosol composition further comprises a corrosion inhibitor selected from the group consisting of sodium benzoate, ammonia, and combinations thereof.

* * * * *